March 31, 1936.  W. H. KNISKERN  2,035,898
VALVE
Filed Sept. 25, 1930
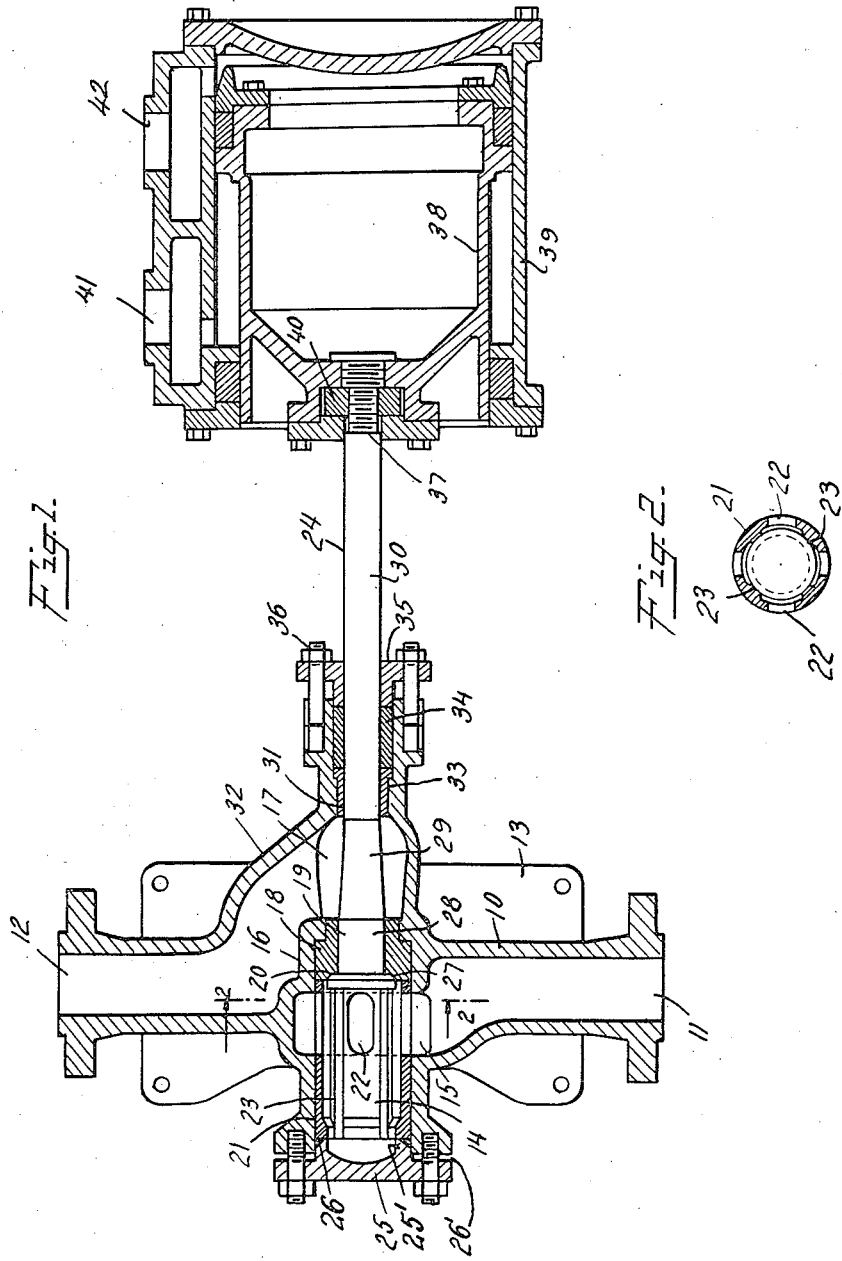
INVENTOR
*Walter H. Kniskern*
BY
ATTORNEY Patented Mar. 31, 1936

2,035,898

UNITED STATES PATENT OFFICE 2,035,898

VALVE

Walter H. Kniskern, Prince George County, Va., assignor to Atmospheric Nitrogen Corporation, New York, N. Y., a corporation of New York Application September 25, 1930, Serial No. 484,259

4 Claims. (Cl. 251—28)

This invention relates to valves and more particularly to valve devices applicable to control the escape of fluids under conditions involving a large pressure drop between the inlet and outlet ports of the valve.

One object of this invention is to provide a valve of simple and rugged design to control the flow of fluids, liquid or gas, under pressure, which valve is so designed as to separate the functions of tightly sealing the valve when closed and wire drawing during operation. That is to say, in accordance with this invention, a portion of the valve stem other than the sealing portion is designed to be subjected to the wire drawing effects occasioned by the flow of fluid from the inlet to the outlet side of the valve, thus leaving the sealing portion of the valve, the beveled seat, intact, in order to effect tight closing when desired. Another object is to provide such valve constructed and arranged so that the high pressure within the valve functions to maintain the valve seated, the valve stem being moved upon opening the valve against the high pressure within the inlet chamber and further, to provide such valve with the stem projecting from the outlet or low pressure chamber so that the stem has to be packed to withstand the low pressure in the outlet chamber and not the high pressure existing in the inlet chamber. Other objects and advantages will appear from the following detailed description.

In the accompanying drawing forming a part of this specification and showing for purposes of exemplification a preferred form of this invention without limiting the claimed invention to such illustrative instance:

Fig. 1 is a vertical section partly in elevation through a valve and servo-motor for operating the valve embodying the improvement of the present invention;

Fig. 2 is a section through the valve stem and bearing support therefor taken in a plane indicated by the line 2—2 of Fig. 1.

In the preferred embodiment illustrated on the drawing, the invention is shown incorporated in a valve, the stem of which is adapted to be moved by a servo-motor and the present description will be confined to the present illustrated embodiment of the invention. It will be noted, however, that the novel features and improvements are susceptible to other applications, such, for example, as manually operated valves or valve devices generally, particularly valves for controlling escape of fluids involving a large pressure drop from the inlet to the outlet side thereof. Hence, the scope of this invention is not confined to the embodiment herein disclosed.

In the drawing, 10 indicates the valve housing preferably cast integral to provide an inlet port 11 and a discharge port 12. The housing may be supported on or cast integral with the supporting casting 13. Inlet port 11 communicates with high pressure inlet chamber 14 preferably of cylindrical shape and formed with an enlarged chamber portion 15.

A wall 16 preferably integral with the valve housing separates the inlet chamber 14 from the outlet chamber 17 communicating with the outlet port 12. This wall is formed with an opening providing a housing support for the valve seat 18, which snugly rests within the opening in wall 16 as shown in Fig. 1. The seat 18 is provided with a cylindrical seating portion 19 and a truncated conical sealing portion 20.

Distance piece 21, provided with radially disposed openings 22 and also radially disposed ribs 23 which constitute a bearing support for piston stem 24, is mounted within the housing 14. One end of this bearing member abuts against the seating block 18 and maintains it in fixed position. The other end of the distance piece 21, as well as the end of chamber 14, is closed off by cover plate 25 bolted or otherwise secured to the walls defining chamber 14. A conical seat for a rubber gasket 26 is formed between the flange 25' on cover plate 25 and the walls of chamber 14, and a clearance space 26' is disposed between the end of the walls of chamber 14 and the cover plate. This construction permits simultaneous sealing of the valve and pressure upon distance piece 21.

The valve stem 24 is constituted of what might be considered a sealing portion 27 of truncated conical shape, the sealing portion functioning to tightly close the valve, a cylindrical seating portion 28 of an extent approximately equal to or slightly greater than the extent of cylindrical seat 19, a truncated conical portion 29 which, when moved through the cylindrical portion 19, permits flow of fluid therethrough and the stem proper 30 which is of smaller diameter than the cylindrical portion 28. Portions 27, 28, 29 and 30, it will be noted, are in longitudinal alignment. Sealing portion 27 is adapted to sit within the sealing portion 20 of the seat 18 and form a tight closure for the valve. The diameter of seating portion 28 is substantially the same as that of seat 19, there being only a few thousandths of an inch clearance between the two. The base of conical portion 29 is of the same diameter as portion 28 and the apex of this portion is of reduced diameter and preferably of the same diameter as the stem portion 30.

Stem 24 it will be noted extends through opening 31 in wall 32 defining one wall of the low pressure chamber 17. Opening 31 is provided with a throat bushing 33 for stem 24, usual packing 34 and a packing retaining member 35 which may be bolted as indicated at 36 or otherwise secured to the wall 32 to retain the packing and maintain a fluid tight joint about the stem. Since stem 24 extends through wall 32 of the low pressure chamber 17, it has to be packed only against the low pressure in this chamber and not against the high pressure occurring in chamber 14 of the valve.

The end of valve stem 24 extending through the wall 32 is threaded at 37 and is secured to the stepped piston 38 in the operating cylinder on servo-motor 39 by nut connection 40 or by any other suitable means. Pressure fluid from a suitable source may be introduced and discharged into and from servo-motor 39 through ports 41 and 42 and thereby move the piston 38 to the left (Fig. 1) and back, thus moving the piston to open and close the valve.

In operation with the valve stem in seated position as shown in Fig. 1, admission of pressure fluid to the servo-motor 39 causes valve stem 24 to move towards the left, removing sealing portion 27 of the stem from the sealing portion 20 of the seat 18. Since the cylindrical seating portion 28 remains within the seat 19, no substantial flow through the valve takes place. Continued movement of the valve stem causes cylindrical portion 28 to completely leave the seat 19 and conical portion 29 to enter this seat providing a substantial space through which fluid flows from the high pressure chamber 14 to the low pressure chamber 17. Further movement towards the left, due to the conical shape of portion 29, increases the extent of this space and consequently increases the rate of flow through the valve. Conversely, movement towards the right from a partially open position decreases the rate of flow through the valve.

It will be noted that initial movement of stem 24 from closed position does not initiate flow through the valve. Hence, the sealing portion 27 is not subjected to wire drawing caused by the rush of fluid from the high pressure chamber 14 into the empty low pressure chamber 17. This leaves the beveled seat 27 intact to effect tight closing of the valve when desired and increases the effective life of the valve.

It will also be noted that substantial flow through valve seat 19 takes place only when cylindrical portion 28 leaves seat 19. Wire drawing of the end of portion 28 remote from the sealing portion 27 is obviously of no moment since this end of portion 28 is not intended to have a sealing or closing function. Further, when the valve is closed, the pressure within the chamber 14 aids in maintaining the valve stem in sealing and seated position.

The invention as hereinabove described is embodied in a particular form of construction, but it may be variously embodied within the scope of the following claims.

I claim:

1. A valve comprising a valve housing, a valve stem extending through a packing gland in the outlet side of said housing, a seat in said housing for said stem, said stem involving, in the order mentioned, a sealing portion arranged to abut against said seat, a seating portion adapted to fit within said seat, and a portion of reduced diameter arranged to be moved through said seat to permit flow therethrough, the sealing portion of said stem being arranged to be held in seated position in said seat by the pressure within the inlet side of the valve, the initial movement of the valve stem away from said seat resulting in movement of the sealing portion away from said seat, the seating portion remaining within said seat, thereby preventing flow therethrough and wire drawing of the sealing portion of the valve stem, continued movement of the stem resulting in the seating portion leaving the seat, thereby permitting flow through said seat.

2. A valve comprising a valve housing, a valve stem, a seat in said housing for said stem, said seat having a beveled portion in an end wall thereof, said stem comprising, in the order mentioned, a bevel seat adapted to register with said beveled portion, a large diameter and a small diameter portion connected by a tapered portion, the large diameter portion of the stem fitting snugly within said seat, said bevel seat on the stem being arranged to engage the bevel portion in the end wall of said seat and held in sealed position by the pressure within the inlet side of said valve.

3. A valve for controlling escape of fluid under pressure permitting a pressure drop in the fluid at the outlet side of said valve, comprising a housing consisting of a fluid inlet chamber and a fluid outlet chamber, a valve stem movable in said housing, having one end extending exteriorly of the housing through the wall of the outlet chamber, thus necessitating packing of said stem at the points which extend through the housing against the low pressure occurring in the outlet chamber, a seat for said stem providing a communicable connection between the inlet and the outlet chambers, said seat comprising a cylindrical portion leading into the outlet chamber and a truncated conical sealing portion in line with said cylindrical portion, the base of the conical portion communicating with said inlet chamber, said valve stem comprising a conical sealing portion arranged to register with said conical sealing portion in said seat and constructed and arranged so that the pressure within the inlet chamber acts on the conical sealing portion to maintain it in sealed position, said stem also comprising a cylindrical seating portion in line with said conical portion of said stem and extending within said cylindrical portion in said seat and a truncated conical portion adapted to be moved into the cylindrical seating portion of said seat to permit flow therethrough.

4. A valve for controlling escape of fluid under pressure permitting a pressure drop in the fluid at the outlet side of said valve, comprising a housing consisting of a fluid inlet chamber and a fluid outlet chamber, a valve stem movable in said housing, having one end extending exteriorly of the housing through the wall of the outlet chamber, thus necessitating packing of said stem at the points which extend through the housing against the low pressure occurring in the outlet chamber, a seat for said stem providing a communicable connection between the inlet and the outlet chambers, said seat comprising a cylindrical portion leading into the outlet chamber and a truncated conical sealing portion in line with said cylindrical portion, the base of the conical portion communicating with said inlet chamber, said valve stem comprising a conical sealing portion arranged to register with said conical sealing portion in said seat and constructed and arranged so that the pressure within the inlet chamber acts on the conical sealing portion to maintain it in sealed position, said stem also comprising a cylindrical seating portion in line with said conical portion of said stem and extending within said cylindrical portion in said seat and a truncated conical portion adapted to be moved into the cylindrical seating portion of said seat to permit flow therethrough, bearing supports in said inlet chamber for the valve stem to support and guide it in its reciprocatory motion in the inlet chamber and means for moving said stem from a position, with the sealing portion thereof in contact with the sealing portion of the seat into and partially through the high pressure inlet chamber and back into sealing position.

WALTER H. KNISKERN.